May 11, 1948.  R. T. JONES  2,441,151
CONTROL SURFACE WITH BEVELED TRAILING EDGE
Filed April 12, 1945   5 Sheets-Sheet 1
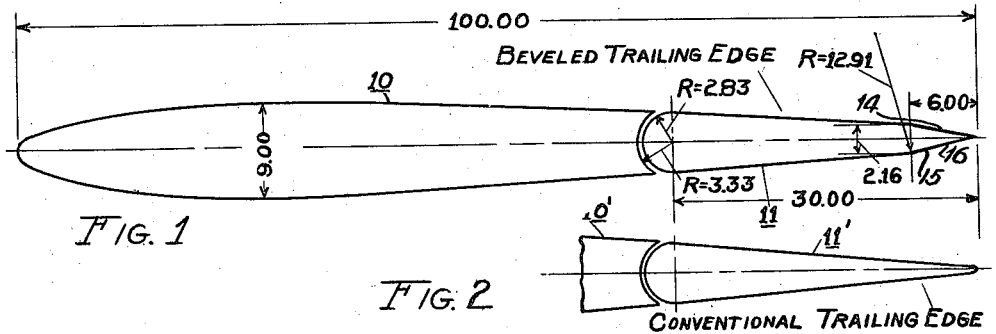
FIG. 1
FIG. 2
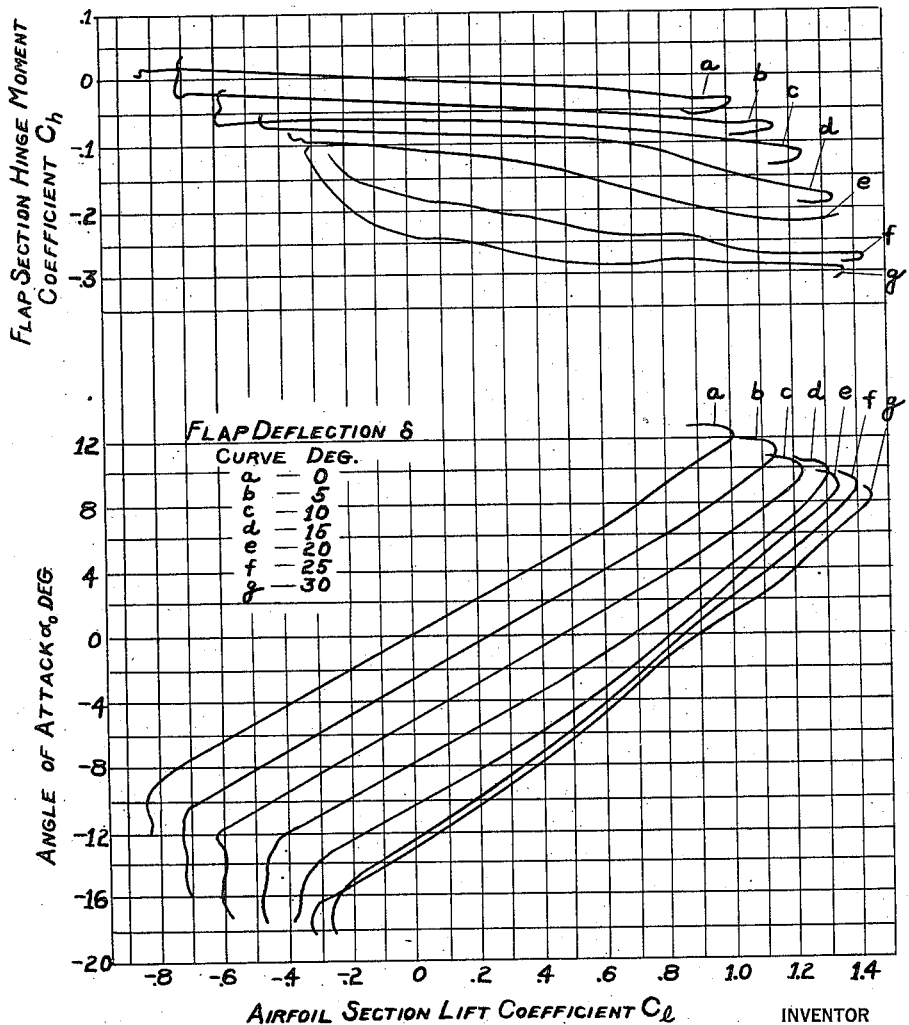
FIG. 7
INVENTOR
ROBERT T. JONES.
BY
ATTORNEY Inventor
ROBERT T. JONES Patented May 11, 1948

2,441,151

UNITED STATES PATENT OFFICE 2,441,151

CONTROL SURFACES WITH BEVELED TRAILING EDGE

Robert T. Jones, Hilton Village, Va.

Application April 12, 1945, Serial No. 588,051

6 Claims. (Cl. 244—75)

(Granted under the act of March 3, 1883, as amended April 30, 1928; 370 O. G. 757)

This invention relates to airfoil structure for aircraft, particularly to the structure of the portion thereof which comprises a deflectable control surface, and is a continuation-in-part of my application Serial No. 484,737, filed April 27, 1943, now abandoned, for Control surfaces with beveled trailing edges.

It is standard practice in present day aircraft structure to design an airfoil so that the rear portion thereof terminates in a relatively thin, comparatively sharp, trailing edge. When the rear portion of the airfoil is hinged to provide a control flap, such as an aileron, elevator or rudder, it is conventional practice to provide the control flap with a hinged tab at the trailing portion of the control flap, and to provide a mechanical linkage by which the tab may be deflected by the pilot in the desired direction.

The function of the tab is to create an aerodynamic balance in order to reduce the moment at the hinge line of the control flap required to rotate it from a neutral position. To put it another way, the tab acts as a sort of servo-motor device which reduces the amount of force that must be exerted by the pilot on the control flap in order to deflect it to a desired angular position from a plane through the airfoil chord.

I have discovered that substantially the same aerodynamic balancing effect can be produced by so shaping the flap as to produce the outline of the deflected balancing tab on both upper and lower surfaces of the airfoil. My invention thus constitutes a marked improvement over the balancing tab structure in that no moving parts are required. Of further advantage is the fact that all possibility of flap-flutter due to looseness in the tab linkage is avoided.

An additional advantage of my invention is that balance is provided against pressure caused by the angle of attack of the airfoil as a whole, whereas the balancing tab acts only when the flap, to which it is linked, is deflected.

Still another advantage which a flap designed in accordance with this invention has over the conventional hinged balancing tab lies in the fact that with the linked movable tab, the convex curvature formed at the hinge line is relatively sharp and abrupt, the radius of curvature being of necessity equal to one-half of the conventional thickness at this point. As is well known in aerodynamics, such a sharp curvature will cause the airstream to separate from the surface when the tab is deflected through too great an angle. If such separation occurs, the balancing action of the tab is lost and, in standard practice, it is therefore necessary to limit deflection of the tab to comparatively small angles to avoid separation. However, in a control flap embodying my invention, it is contemplated that a larger radius of curvature would be used and separation thus delayed.

Also, as is well known in aerodynamics, a sharp curvature of the surface creates relatively high local velocities, which, in high speed flight, cause shock waves to form in the airstream. Formation of these shock waves by the sharp curvature effectively limits the usefulness of the conventional balancing tab for high speed flight. Such shock waves are easily avoided in my invention by making the radius of the convex curvature sufficiently large.

In the detailed description of my invention which follows, it is convenient to refer to the modified rear portion of the control flap as being "beveled." However, it is to be understood that the surface over the beveled portion of the flap is not necessarily a plane surface. In fact, it is particularly important that there be no actual discontinuity or angle in the surface where the bevel begins. Hence the beginning of the bevel portion is marked by an appreciable or pronounced convex curvature. From this point on out to the trailing edge of the control flap, the "bevel" section may be a plane surface or a slightly curvilinear one either convex or concave in character.

My discovery has been confirmed by wind tunnel tests on models of laminated mahogany having a two foot chord and a four foot span. In these tests, the lift was measured on a three component balance and the hinge moments were measured electrically with a calibrated torque rod built into the model. The wind tunnel tests were made at a dynamic pressure of fifteen pounds per square foot, corresponding to a velocity of about seventy-six miles per hour and a test Reynolds number of 1,430,000. The deflection of the control flap was varied in 5° increments from 0° to 30°. Lift of the airfoil and hinge moments of the control flap were measured throughout the angle of attack range, from positive to negative stall of the airfoil, at 2° increments of angle of attack.

Several models were tested, each having a different degree of beveling. The results of the tests of all models are not tabulated here but for purposes of illustration, I have elected to show the result of the wind tunnel tests on a model in which the bevel extends for 20% of the flap chord (which is 6% of the airfoil chord), the thickness of the flap at the point where beveling begins being 2.16% of the airfoil chord. The beginning of the bevel at points A and B on the upper and lower flap surfaces, respectively, is marked by a pronounced convex curvature in the surface of the flap, the curved portion then being followed by a plane surface which extends all the way to the trailing edge. This particular model is shown in elevation in Fig. 1.

For purposes of comparison, Fig. 2 shows in elevation, a fragmentary portion of an airfoil provided with a control flap and hinged balancing tab of conventional contour.

Fig. 7 is a family of curves showing results obtained on the model in Fig. 1.

Figure 8:
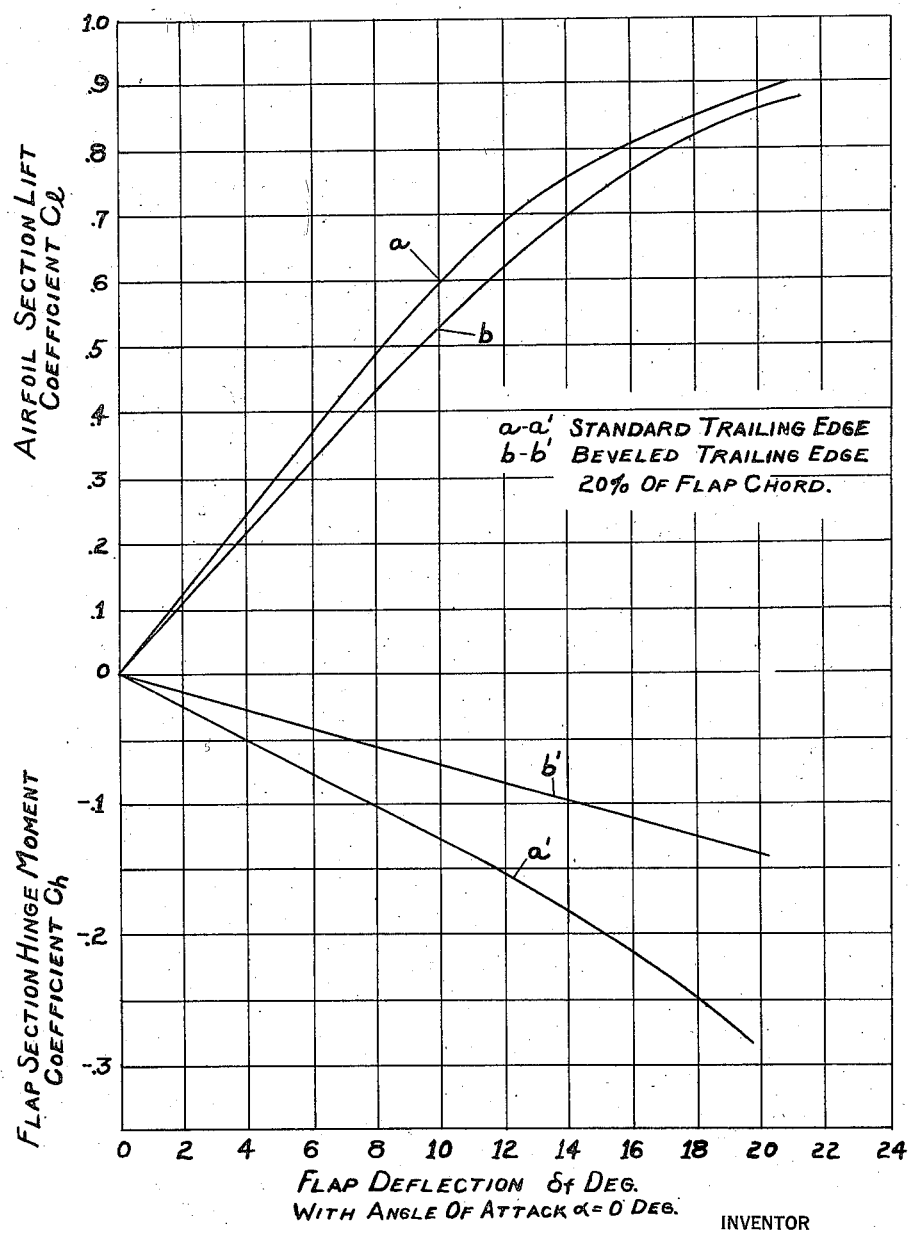
Figs. 8 and 9 are curves cross-plotted from the curves in Fig. 7 as compared with similar curves resulting from tests of a conventional type of airfoil without the bevel and terminating in a thin sharp trailing edge.

In connection with the curves shown in Figs. 7 and 8, the following symbols are utilized.

Figure 3:
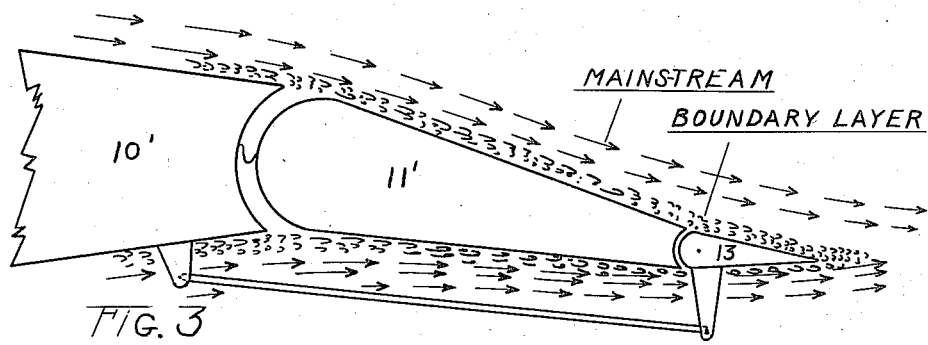
Fig. 3 is an enlarged view of the conventional flap and tab shown in Fig. 2, illustrating the flow of air outside the boundary layer.

$c_l$ airfoil section lift coefficient ($l/qc$)
$c_h$ flap section hinge moment coefficient ($h/qc_f^2$)
$\alpha$ angle of attack of infinite aspect ratio
$\delta f$ flap angle with respect to airfoil
$l$ airfoil section lift
$h$ flap section hinge moment
$c$ chord of airfoil with flap neutral
$c_f$ flap chord Referring now to the drawings and in particular to Fig. 1, there is shown an airfoil 10, the leading and medial portions of which are of conventional design but including a pivotally mounted control flap 11 having a contour embodying my invention. The dimensions shown in Fig. 1 are in percentage of the chord (c) of the airfoil 10. It will be evident from Fig. 1 that the control flap which embodies my invention differs from the conventional control flap 11' shown in Figs. 2 and 3 in two ways. First, the control flap in Fig. 1 is substantially thicker than the control flap shown in Figs. 2 and 3, and secondly, instead of having a surface which is a continuation of the airfoil 10', narrowing down gradually to a relatively thin trailing edge as is the case in Figs. 2 and 3, it is beveled to a relatively sharp point, the bevel beginning at points A and B on the flap 11. The distance between a line connecting points A and B and the trailing edge 16 is equal to 6% of the total length of the airfoil or 20% of the flap chord $c_f$. As previously explained it will be noted from Fig. 1 that the beginning of the bevel is marked by a pronounced convex curvature, the radius of curvature at this point being equal to 12.91% of the airfoil chord. The upper and lower convexly curved portions then merge into plane surfaces 14 and 15, respectively, which intersect at the trailing edge 16 of the flap 11. The "bevel angle" i. e. the angle formed by lines connecting the trailing edge 16 of the control flap 11 with points A and B on the upper and lower surfaces, respectively, at which the beveling begins is slightly greater than 20°. In the embodiment shown in Fig. 1, such connecting lines are of course coincident with the plane surfaces 14 and 15.

Figure 9:
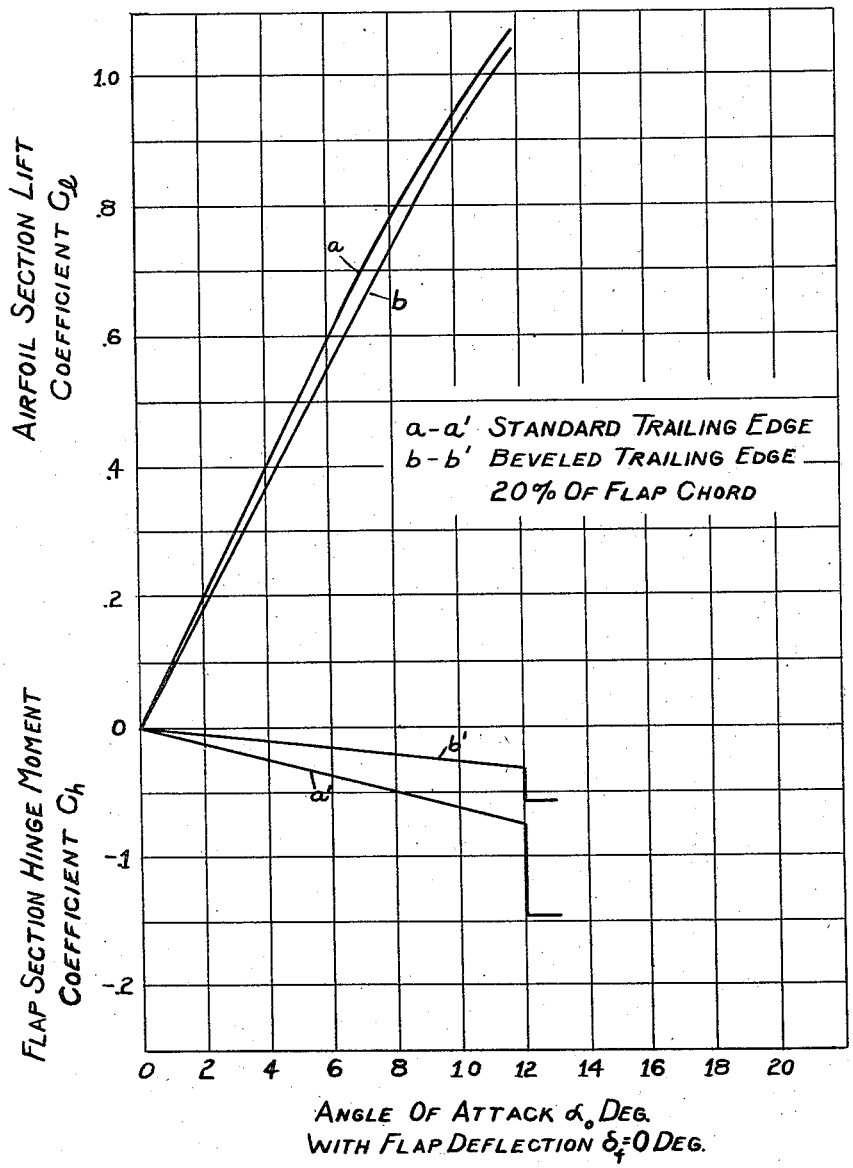

The curves shown in Fig. 7 were plotted from test data obtained in the wind tunnel tests of the airfoil shown in Fig. 1, and from these curves, the curves in Figs. 8 and 9 were plotted.

Curves $a$ and $a'$ in Figs. 8 and 9 are for an airfoil of conventional design such as shown in Fig. 2 but without a tab portion incorporated therein, and curves $b$ and $b'$ are for the airfoil shown in Fig. 1.

It will be evident from an examination of the curves in Figs. 8 and 9 that the flap section hinge moment coefficient $c_h$ of my modified flap is materially less than that for the airfoil shown in Fig. 2 and outweighs the slight loss in lift.

It is also interesting to note from Fig. 8 that the change in the flap section hinge moment coefficient $c_h$ per unit change in flap deflection $\delta f$, i. e.

$$\frac{\Delta c_h}{\Delta \delta f}$$

for the beveled airfoil is less than that for the standard airfoil. Similarly in Fig. 9, the change in flap section hinge moment coefficient $c_h$ per unit change in angle of attack, i. e.

$$\frac{\Delta c_h}{\Delta \alpha}$$

for the beveled airfoil is less than that for the standard airfoil. Thus the control-free stability of the airfoil is improved.

Figure 4:
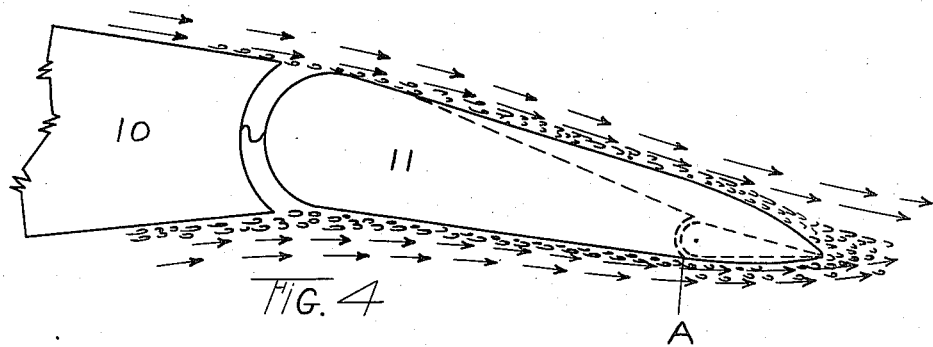
Fig. 4 is an enlarged view of the flap portion of the airfoil shown in Fig. 1, illustrating the flow of air outside the boundary layer.
Figure 5:
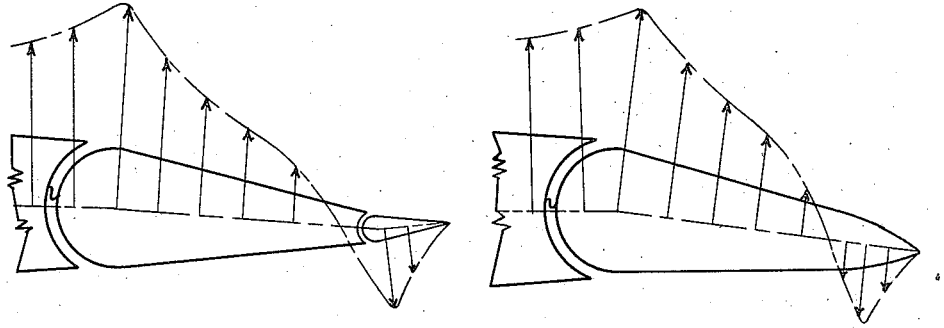
Fig. 5 is a diagram showing the distribution of lift over a flap and tab of conventional construction.
Figure 6:
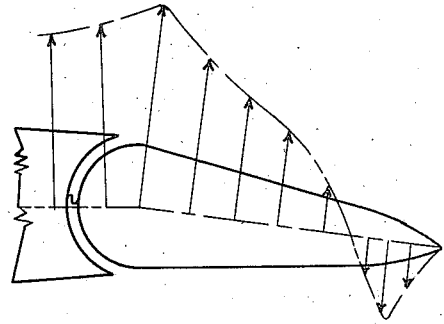
Fig. 6 is a diagram showing the distribution of lift over a flap which is thickened and provided with a "beveled" trailing edge in accordance with this invention.

That the design of a control flap in accordance with this invention gives the same results as those obtained in the conventional tab arrangement may be seen from Figs. 3 to 6. When an airfoil 10 to which a control flap embodying my invention is attached, is made to develop lift, such as by giving the airfoil as a whole an angle of attack or by deflecting the control flap downwardly, a greater adverse pressure gradient is caused to exist along the upper surface of the flap than along the lower surface with the result that the thickness of the boundary layer becomes relatively greater on the upper surface than on the lower surface. The flow of the main airstream outside the retarded layer ceases to follow the beveled portion of the upper surface near the trailing edge perfectly because of the greater thickness of the boundary layer. On the other hand the flow follows the beveled portion of the lower surface more perfectly because of the relatively thinner boundary layer there. The result is that the airstream on leaving the control flap 11 is deflected upward as shown in Fig. 4 in a manner similar to that produced by the conventional balancing tab 13 in Fig. 3. The reaction from the upward deflection of the airstream appears as a downward lift on control flap 11 near the trailing edge producing a balancing action as shown by the lift diagram in Fig. 6, which corresponds in its effect to the downward lift and balancing action produced by a balancing tab, the lift diagram of which is shown in Fig. 5.

It is obvious that a similar balancing action will occur when the angle of attack of the complete airfoil or the flap deflection is reversed.

Figure 10:
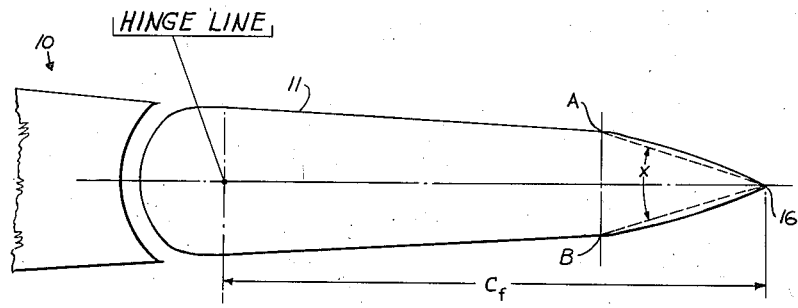
Figs. 10, 11 and 12 are modifications of the beveled contour shown in Fig. 1.
Figure 11:
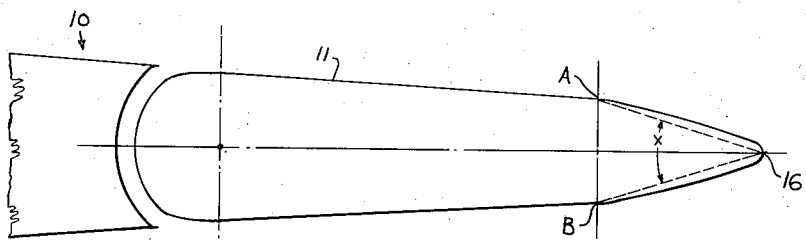
Figure 12:
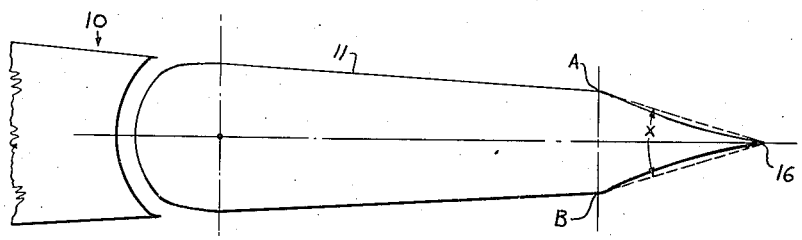

It has been stated previously that the beveled portion of the control flap 11 does not necessarily have to be constituted by upper and lower plane surfaces and that accordingly the portion of the bevel following the pronounced convex curvature portion may merge into a curvilinear surface of lesser curvature which may be either convex or concave in character. Figs. 10, 11 and 12 show modified forms of the control flap bevel.

Referring now to Fig. 10, it will be seen that the beveled portion of the flap 11 from the points A and B on the upper and lower surfaces, respectively, is similar to the type of bevel illustrated in Fig. 1. That is, the beginning of the bevel on the upper and lower flap surfaces, respectively, is constituted by a surface which has a pronounced convex curvature. However the upper and lower convexly curved portions instead of merging into plane surfaces as is the case in Fig. 1, are curvilinear in character all the way to the trailing edge 16, it being noted that the curved surface lies slightly outside of the lines connecting the trailing edge 16 of flap 11 with points A and B on the upper and lower flap surfaces, respectively.

In Fig. 11, another modification of the beveled control flap is shown. It will be noted in this modification that, like Fig. 1, the beginning of the beveled portion is marked by a pronounced convex curvature which then merges into a curvilinear surface somewhat elliptical in character and terminating in a slightly rounded trailing edge instead of the sharply pointed trailing edge of the flap shown in Fig. 1. Like Fig. 10, the curved surfaces extend slightly outside of the lines connecting trailing edge 16 with points A and B.

Fig. 12 shows still another modification of the bevel. Like the previously mentioned embodiments, the beginning of the bevel is marked by a pronounced convex curvature but this convex curvature then merges into a slightly concave curvilinear path which extends to the trailing edge 16 of the flap 11. The curved portion of the bevel extends slightly inside of the lines connecting the trailing edge 16 of the flap with the points A and B on the flap.

In any of the different modifications of the bevel shown in Figs. 1, 10, 11 and 12, the desired degree of beveling will vary somewhat with the design characteristics of the airfoil. That is to say that the characteristics of the bevel will depend somewhat upon the particular Reynolds number which is a ratio that varies directly with the velocity and chord length of the airfoil and inversely with the kinematic viscosity, the latter being the ratio of viscosity to density of the air. Also to be taken into consideration in the design of the beveled portion of the control flap is the Mach number which is the ratio between the velocity of the airfoil relative to air and the local velocity of sound.

As a result of tests carried out with respect to this invention, conclusions as to design limits in the bevel are that the bevel angle (as previously defined) will be determined by the relative thickness and velocity of the boundary layer in accordance with principles of the invention and may vary between 15° and 40°. It has likewise been concluded that the distance between the trailing edge 16 and a line connecting points A and B on the control flap 11 may lie between 15% and 35% of the control flap chord $c_f$. If the points A and B, where the pronounced convex curvature begins, were to extend any further forward over the main portion of the control flap, the negative lift produced by this curvature would not have an effective balancing action because of its short lever arm, and would at the same time, because of the greater fraction of the surface involved tend to defeat the primary purpose of the control flap in developing positive lift.

The invention described herein may be manufactured and used by or for the Government of the United States of America for governmental purposes without the payment of any royalties thereon or therefor.

What is claimed is:

1. An airfoil having a control flap hingedly connected thereto, the trailing portion of said flap terminating in a bevel to provide aerodynamic balancing of the flap in deflected positions, the angle between upper and lower surfaces at the trailing edge being between 15° and 40°, and the bevel extending between 15% and 35% of the flap chord.

2. An airfoil having a control flap hingedly connected thereto, aerodynamic balancing of said flap being obtained by shaping the upper and lower surfaces thereof inwardly at the trailing portion to form a bevel, the angle between the upper and lower surfaces at the trailing edge being between 15° and 40°, and the bevel length extending from the trailing edge forward along the longitudinal axis of the airfoil for a distance between 15% and 35% of the flap chord.

3. An airfoil having a control flap hingedly connected thereto, the trailing portion of said flap terminating in a bevel to provide aerodynamic balancing of the flap, the angle between the upper and lower surfaces at the trailing edge being between 15° and 40°, and the bevel extending between 15% and 35% of the flap chord measured from the trailing edge to the line between the points on the upper and lower flap surfaces initiating the bevel.

4. An airfoil having a control flap hingedly connected thereto, the trailing surface portion of said flap being characterized by a pronounced convex curvature to form a bevel for providing aerodynamic balancing of the flap, the angle between the upper and lower surfaces at the trailing edge being between 15° and 40°, and the bevel extending between 15% and 35% of the flap chord.

5. An airfoil having a control flap hingedly connected thereto, the trailing portion of said flap terminating in a bevel to provide aerodynamic balancing of the flap, said bevel being formed by a pronounced convex curvature on the upper and lower flap surfaces merging into plane faces extending to the trailing edge, the angle between the upper and lower surfaces at the trailing edge being between 15° and 40°, and the bevel extending between 15% and 35% of the flap chord.

6. An airfoil having a control flap hingedly connected thereto, the trailing portion of said flap terminating in a bevel to provide aerodynamic balancing of the flap, said bevel being initiated by a pronounced convex curvature on the upper and lower flap surfaces merging into curvilinear surfaces of lesser curvature extending to the trailing edge, the angle between the upper and lower surfaces at the trailing edge being between 15° and 40°, and the bevel extending between 15% and 35% of the flap chord.

ROBERT T. JONES.

REFERENCES CITED

The following references are of record in the file of this patent:

UNITED STATES PATENTS

| Number | Name | Date |
| --- | --- | --- |
| 1,744,889 | Hammons | Jan. 28, 1930 |
| 2,070,809 | Root | Feb. 16, 1937 |